United States Patent [19]

Shaw, Jr.

[11] 3,723,363
[45] Mar. 27, 1973

[54] TRIMERIZED CRUDE ISOCYANATE MIXTURES AND POLYURETHANE FOAMS PREPARED FROM SAME

[76] Inventor: Fred D. Shaw, Jr., 6911 W. 69th St., Overland Park, Kans. 66204

[22] Filed: Sept. 23, 1970

[21] Appl. No.: 74,872

Related U.S. Application Data

[63] Continuation-in-part of Ser. No. 676,626, Oct. 19, 1967, abandoned.

[52] U.S. Cl........260/2.5 AW, 252/182, 260/2.5 AT, 260/75 NT, 260/77.5 AT, 260/77.5 NC
[51] Int. Cl..........................C08g 22/44, C08g 22/22
[58] Field of Search...260/2.5 AT, 2.5 AW, 77.5 AT, 260/77.5 NC, 453 A, 453 AP

[56] References Cited

UNITED STATES PATENTS

| | | | |
|---|---|---|---|
| 2,978,449 | 4/1961 | France et al. | 260/248 |
| 3,108,100 | 10/1963 | Tate et al. | 260/248 |
| 3,215,652 | 11/1965 | Kaplan | 260/2.5 |
| 3,426,058 | 2/1969 | Wagner et al. | 260/453 |
| 3,278,492 | 10/1966 | Herbstmann | 260/77.5 |
| 3,476,710 | 11/1969 | Altscher et al. | 260/77.5 |
| 3,494,952 | 2/1970 | Nakata et al. | 260/453 |
| 3,621,020 | 11/1971 | Ojakaar | 260/248 |
| 3,652,424 | 3/1972 | Jackson et al. | 252/182 |

*Primary Examiner*—Donald E. Czaja
*Assistant Examiner*—H. S. Cockeram
*Attorney*—Vernon R. Rice

[57] ABSTRACT

Polyisocyanate compositions containing phosgenation by-products and isocyanurate radicals. The polyisocyanates are used in the preparation of various polyurethane products such as foams, coatings, adhesives and solid elastomers. The polyisocyanates are particularly valuable in the preparation of low density, rigid foams having high insulation value, high compressive strength and good dimensional stability at low and high temperatures.

22 Claims, No Drawings

TRIMERIZED CRUDE ISOCYANATE MIXTURES AND POLYURETHANE FOAMS PREPARED FROM SAME

RELATED APPLICATIONS

This application is a continuation-in-part of copending application Ser. No. 676,626, filed Oct. 19, 1967 and now abandoned.

BACKGROUND OF THE INVENTION

Isocyanates of various types are of great importance in the preparation of commercially attractive polyurethane elastomers, coating compositions and foams. Of these products, rigid foams are finding increased application in various industries such as refrigeration insulation, pipe and tank insulation, structural uses, e.g., preformed rigid panels, and aircraft structural parts. Rigid foams are usually characterized as having a high ratio of compressive to tensile strength, low elongation and a low recovery rate from distortion. The raw materials used in rigid foams comprise di- and higher polyfunctional isocyanates, a polyfunctional hydroxyl material and a blowing agent.

It is important that isocyanates used in preparing rigid foams give foams of high thermal insulation, low density, high compressive strength and be sufficiently reactive to permit rapid demolding when the foaming composition is formed in a mold. Although many isocyanate compositions are known which have been used to make more-or-less acceptable foams, e.g., those described in U.S. Pat. No. 3,215,652 to Kaplan and U.S. Pat. No. 2,978,449 to France et al., there remains a need for an isocyanate which will produce low density rigid foams exhibiting outstanding performance in the physical properties mentioned above.

SUMMARY OF THE INVENTION

This invention consists essentially of aromatic polyisocyanate compositions containing about 5–50 percent by weight phosgenation by-products and isocyanurate radicals, said compositions having an amine equivalent of about 92–170 and an over-all isocyanato group functionality of at least about 2. The compositions of this invention can be prepared by (1) phosgenating an aromatic polyamine to obtain a crude polyisocyanate composition containing up to about 50 percent by weight phosgenation by-products, and (2) trimerizing a portion of the isocyanato groups of the product obtained in step (1) until the desired amount of isocyanurate radicals is obtained, or alternatively, the polyisocyanate compositions are prepared by (1) phosgenating an aromatic polyamine to produce a crude composition containing phosgenation by-products, and (2) mixing a trimerized aromatic polyisocyanate with the product of step (1) in such proportions to prepare a product containing about 5–50 percent by weight phosgenation by-products and the desired amount of isocyanurate radicals.

DETAILED DESCRIPTION

The weight percents, amine equivalent and overall functionality values indicated are based on only those molecules present bearing free isocyanato groups.

The "phosgenation by-products" are complex, high molecular weight, tarry, non-volatile materials produced by the reaction of phosgene and aromatic polyamines. Such phosgenation by-products are generally considered by those skilled in the art to be composed largely of biuret and polymeric biuret molecules bearing free isocyanato groups. They are substantially insoluble in hexane. As used herein the term "phosgenation by-products" means the non-volatile materials remaining in the distillation flask after the phosgenation product of an aromatic polyamine is distilled to remove monomeric isocyanates and the phosgenation solvent. In the case of the phosgenation product of tolylene diamines and phenylene diamines such non-volatiles are those materials remaining in the distillation pot after completion of distillation of aromatic diisocyanates and the phosgenation solvent at between about 1–5 mm. Hg at a final pot temperature of about 200° C. In the case of 4,4'-diaminodiphenylmethane (MDA), non-volatile phosgenation by-products are materials remaining after distillation of the diisocyanate and solvent is completed at about 240° C. and about 1–2 mm. Hg. The meaning of "phosgenation by-products" as applied to the phosgenation products of mixtures of the above diamines and other aromatic diamines can routinely be determined by one skilled in the art. In the case of the phosgenation products of the crude condensation products of aromatic monoamines and formaldehyde, the resulting methylene-bridged polyarylene polyisocyanates having a functionality greater than two should not be considered phosgenation by-products.

It will be readily understood by those skilled in the art and further apparent from the discussion hereinafter, that subsequent to their formation in the phosgenation reaction, the above-described phosgenation by-products may react with other isocyanates and active hydrogen bearing compounds which can be present at some stage in the preparation of the final isocyanate products, thus significantly modifying their form and molecular weight. The 5–50 percent contribution of the phosgenation by-products to the total weight of the final mixture of isocyanates, however, is calculated on the basis of the weight of these by-products in the form in which they exist at the end of the phosgenation reaction prior to modification of their form and molecular weight by subsequent reaction.

The isocyanurate radicals present in the compositions of this invention can be illustrated by the formula:

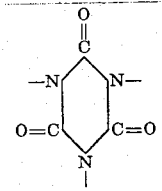

These radicals are contained in monomeric isocyanurates of aromatic isocyanates in which the nitrogen atoms indicated in the above formula are bonded to aromatic residues usually bearing at least one free isocyanato group, such as in tolylene diisocyanate trimer. They also can be contained in polymeric isocyanurates in which the free isocyanato groups of the monomeric trimer have reacted with other isocyanato groups to form additional isocyanurate rings or reacted with various active hydrogen compounds, such as glycols, polyols and polyamines, resulting in the connection of a multiplicity of isocyanurate radicals through urethane or urea linkages. The 3–11 percent isocyanurate value indicated is the weight contributed solely by the isocyanurate radicals of the above-described monomeric or polymeric isocyanurates. Such isocyanurate-containing molecules should have an average isocyanato group functionality of at least about 1.5 and preferably at least 3.

Representative aromatic polyamines which can be phosgenated to produce useful intermediate crude isocyanate mixtures are diamines such as tolylene diamines, 4,4'-diaminodiphenylmethane (MDA), phenylene diamines and naphthalene diamines. The MDA can be distilled or crude undistilled, the latter containing up to about 45 percent by weight of polymeric polyamines. The tolylene diamines are preferred because of their availability and the outstanding properties of mixtures of isocyanates prepared from them.

The preferred proportions of phosgenation by-products and isocyanurate radicals vary with the type of polyamine from which these components are derived. A generally satisfactory isocyanurate content is about 3–11 percent by weight, though compositions containing somewhat more or less isocyanurates, i.e., 2–12 percent, can at times be used. For those derived from tolylene diamines a phosgenation by-product weight percent of about 10–30 percent, an isocyanurate radical weight percent of 3–11 percent and an amine equivalent of about 100–140 are usually preferred. Those derived from MDA should preferably have somewhat lower by-product and isocyanurate radical weight percents and higher amine equivalents. Isocyanate mixtures falling within the foregoing ranges are useable under most operating conditions, react sufficiently fast with polyols and glycols to allow rapid demolding of foams and can be employed to prepare rigid polyurethane foams with superior physical properties as will be discussed hereinafter.

In addition to the essential isocyanurate radical and phosgenation by-product components, the following components can optionally be introduced in preparing the final mixtures of isocyanates:

a. aromatic polyisocyanates such as the tolylene diisocyanates, 4,4'-methylenebis(phenyl isocyanate) (MDI), naphthalene diisocyanates and/or the various phenylene diisocyanate isomers. The preferred polyisocyanates for use here are the tolylene diisocyanates because of their availability and the excellent properties of polyurethanes prepared from them. Mixtures of aromatic polyisocyanates can be used also;

b. polymeric isocyanates produced by the phosgenation of polyamines which are present as by-products in aromatic diamines such as crude 4,4'-di-aminodiphenylmethane. Such di- and higher polyamine mixtures are prepared by the condensation of aniline and formaldehyde in the presence of a mineral acid as illustrated in U.S. Pat. No. 2,683,730 to Seeger. The polymeric isocyanates can be present in the form in which they exist after phosgenation or they can be involved in more complex trimer and other polymeric molecules as indicated in the case of the phosgenation by-products described above;

c. at any stage in the preparation of the isocyanate mixtures subsequent to phosgenation, one or more compounds containing at least two active hydrogen atoms can be introduced. These compounds can be polyalkylene-ether or polyester glycols or polyols having a molecular weight of about 500–5,000, monomeric glycols or polyols having a molecular weight below about 500, diamines, polyamines, and water. Such active hydrogen additives react with the various isocyanato bearing moieties present to chain extend or connect them through urethane or urea linkages. Preferred active hydrogen compounds to be used in this manner are polyols containing about 3–8 hydroxy groups and having an equivalent weight of about 80–500 and amines such as the tolylene diamines and 4,4'-di-aminodiphenylmethane.

Optional components (a)–(c) can be added in any amount as long as the non-volatile phosgenation by-product content, isocyanurate radical content, amine equivalent, and isocyanato functionality remain within the limits specified above.

Mixtures of isocyanates which contain sufficient aromatic diisocyanate to dissolve the other components in the mixture under conditions of use are preferred since solutions of the phosgenation-by-products and isocyanurates in an aromatic diisocyanate provide handling advantages and are much more easily mixed with polyols and other ingredients in polyurethane formulations. Isocyanate mixtures to which the active hydrogen containing compounds indicated above have been added are also preferred because foams prepared with such modified isocyanates exhibit improved physical properties such as reduced friability. In isocyanate mixtures derived in whole or in part from crude 4,4'-methylenedianiline containing some polymeric polyamines, it is preferred to employ the undistilled phosgenation product containing some polymeric isocyanates thus avoiding the expense of separating MDI from the other components.

The isocyanate compositions of this invention can be prepared by a variety of procedures. The preferred method begins with the conventional phosgenation of an aromatic polyamine to obtain a crude isocyanate mixture containing the corresponding polyisocyanate and non-volatile phosgenation by-products (plus polymeric isocyanates if the polyamine phosgenated is crude MDA). Phosgenation can be carried out according to the procedures given in U.S. Pat. Nos. 2,644,007, 2,683,160 and 2,680,127. Another representative procedure involves the continuous preparation of the isocyanate by mixing a solution of phosgene under turbulent flow with the organic amine solution in a closed loop reactor. The resulting organic solution of the isocyanate is normally recirculated to increase the concentration of the isocyanate. This procedure is disclosed in U.S. Pat. No. 2,822,373. The isocyanurate radical content of the compositions is then obtained by trimerizing the crude isocyanates produced in the phosgenation reaction by well known procedures such as those described in U.S. Pat. Nos. 2,801,244, 2,954,363, 2,933,870, 3,252,942 and 3,154,522. Trimerization is continued until the desired level of isocyanurate radicals is reached. The weight loss of isocyanato groups during trimerization is substantially equal to the weight percent of isocyanurate radicals in the trimerized composition, thus the amount of isocyanurate radicals present at any given time can easily be determined. If additional aromatic polyisocyanate is desired, it can be added before or after trimerization. Likewise if less polyisocyanate is desired, it can be removed by distillation either before or after trimerization.

Economically, direct trimerization of crude isocyanates is a preferred route to the present compositions. In a less preferred method, refined or crude isocyanates can be trimerized by the same methods as indicated above and mixed with crude isocyanates to prepare compositions of this invention. The trimerization of crude isocyanates requires somewhat larger amounts of trimerization catalysts because of the higher acidity and hydrolyzable chloride contents of crude isocyanates. The compositions can also be prepared by trimerizing to an isocyanurate radical concentration higher than that desired and subsequently diluting with refined or crude isocyanates or by mixing phosgenation by-products with trimerized refined isocyanates.

Any of the molecules present which contain free isocyanato groups such as aromatic di- and higher polyisocyanates, and phosgenation by-products can participate in isocyanurate trimer formation. The extent to which trimerization is allowed to proceed can be readily controlled by the addition of acids such as hydrogen chloride and phosphoric acid or acid halides such as phosgene, benzoyl chloride, acetyl chloride and adipyl chloride. Active hydrogen compounds such as those described above under optional component (c) can be added at any time subsequent to phosgenation regardless of the procedure employed.

Particularly effective catalysts which can be used in trimerizing isocyanato groups as required by this invention are guanidines of the formula

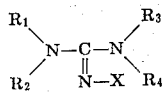

and/or isobiguanides of the formula

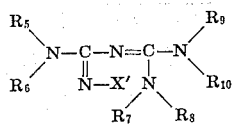

wherein all of the R groups indicated, $R_1$ to $R_{10}$, are independently $C_1$–$C_4$ alkyl, $C_3$–$C_4$ cycloalkyl, 2-oxabutyl, 3-oxabutyl or one or more of the pairs $R_1$–$R_2$, $R_3$–$R_4$, $R_5$–$R_{6a}$, $R_7$–$R_8$, or $R_9$–$R_{10}$ are joined together to form a four to nine membered ring, said ring consisting of carbon atoms and not to exceed two hetero atoms, including the guanidine or biguanide nitrogen atom, from the group consisting of nitrogen, sulfur and oxygen; and X and X' are independently hydrogen, $C_1$–$C_4$ alkyl, $C_3$–$C_4$ cycloalkyl, $C_6$–$C_{18}$ aryl, $C_7$–$C_{18}$ alkaryl, $C_7$–$C_{18}$ aralkyl or a carbamoyl radical of the formula

where Z is the monovalent radical remaining after one isocyanato group has been removed from any of the molecules present bearing free isocyanato groups.

The mixtures of isocyanates of this invention can be dissolved in inert solvents such as trichlorofluoromethane, methylene chloride and dichlorodifluoro-methane. Other additives can be present such as flame retarders, e.g., organic phosphates and antimony trioxide, and stabilizers such as hindered phenols and trialkyl phosphites.

The mixtures of isocyanates of this invention are generally useful in preparing polyurethane foams, adhesives, elastomers and coating compositions, but are especially effective in making rigid polyurethane foams. The rigid foams are prepared in accordance with conventional procedures by reacting an isocyanate of this invention with polyalkyleneether or polyester glycols or polyols in the presence of an expanding agent. Thus, rigid foams can be readily prepared by the prepolymer method which involves reaction of an excess of the isocyanate with a glycol and/or polyol followed by chain extension or cross-linking with an additional portion of a glycol, polyol, diamine, polyamine or water, added in an amount about equivalent to the excess of isocyanato groups remaining after prepolymer formation. Quasi prepolymer techniques in which a prepolymer is first prepared by reacting an excess of the isocyanate with a polyol followed by the mixing of additional isocyanate and a chain-extending agent with the prepolymer can also be used. Rigid foams can also be prepared by "one shot" techniques in which the same ingredients are employed, but all materials are mixed and allowed to react simultaneously, usually in the presence of suitable catalysts.

Preferred polyols for use in preparing rigid foams from the isocyanate compositions of this invention are polyether polyols obtained by oxypropylating polyols such as sucrose, sorbitol, glycerine, trimethylolpropane, 1,2,6-hexanetriol, pentaerythritol or mixtures thereof. Such polyols usually have equivalent weights of about 100–140. Specially preferred polyols are those sold commercially as "Selectrofoam"—6528,—6406 and —6448. Representative cross-linking agents in making rigid foams are water; polyols having a molecular weight less than 500 such as 1,4-butanediol, 1,3-butanediol and trimethylol-propane; polyamines such as methylenedianiline, 4,4'-methylenebis(2-chloroaniline) and the crude polyamines obtained by condensing aromatic monoamines with formaldehyde.

The foam compositions can be expanded by carbon dioxide gas formed in situ by the reaction of water and isocyanate or by the use of a volatile liquid which vaporizes with the exothermic reaction of isocyanate and hydroxyl groups. Representative volatile liquids which can be used are trichlorofluoromethane, methylene chloride and dichlorodifluoromethane. A detailed discussion of the materials and techniques which can be used in the preparation of polyurethane rigid foams using the isocyanate mixtures of this invention can be found in "High Polymers," Saunders and Frisch, Vol. XVI, Polyurethanes: Chemistry and Technology, Interscience Publishers, New York, in Chapter 8 entitled "Rigid Foams."

The polyisocyanates of this invention can also be used to make polyurethane flexible foams, adhesives and coatings by reaction with active-hydrogen compounds such as those described above following techniques well known in the art. In making flexible foams, polyether diols or triols having equivalent weights of about 500–2,000, such as polytetramethyleneether glycol, are preferred.

The use of mixtures of isocyanates described herein in preparing rigid foams results in significant processing advantages and foams exhibiting superior performance. The isocyanate mixtures are sufficiently reactive to allow rapid foam demolding and yet do not cause scorching of the foam compositions. For a given density the foams have superior compressive strength and excellent dimensional stability over a wide range of temperatures. A particularly important advantage of the foams is their excellent heat insulation properties at low densities as represented by low K factors. Further, rigid foams prepared from polyisocyanate compositions of this invention generally have lower friability, especially when a polyol as described under optional component (b) above is used in combination with the polyisocyanate.

Throughout the examples, the isocyanate compositions described below will be referred to as intermediates in the preparation of isocyanate mixtures of this invention:

Polyisocyanate A — Tolylene diamine (80% 2,4-isomer; 20% 2,6-isomer) is dissolved in o-dichlorobenzene and phosgenated substantially by the procedure disclosed in U.S. Pat. No. 2,822,373. Following the phosgenation, o-dichloro-benzene is removed by fractional distillation. The undistilled polyisocyanate contains about 85–90 percent of volatile tolylene diisocyanates with the remainder being phosgenation by-products. The amine equivalent of the material is about 95–100, based on its analysis for isocyanato groups by ASTM D1638–60T.

Polyisocyanate B — About half of the volatile tolylene diisocyanates of Polyisocyanate A is removed by distillation. The undistilled portion of the polyisocyanate contains about 75 percent of volatile tolylene diisocyanates with the remainder being phosgenation by-products. The amine equivalent of the material is about 105–113 based on its analysis for isocyanato groups by ASTM D–1638–60T.

Polyisocyanate C — Undistilled 4,4'-diaminodiphenylmethane containing about 15 percent polyamines, is prepared by adding 1 mole of aqueous formaldehyde to an aqueous solution of 3 moles of aniline and 2.8 moles of hydrochloric acid. The formaldehyde addition is made at about 30° C. and followed by heating at 85° C. for 3 hours. The condensation mass is neutralized with sodium hydroxide and the organic layer is separated. Unreacted aniline is removed by distillation at reduced pressure. The undistilled mixture of di- and polyamines is dissolved in o-dichloro-benzene and converted to the corresponding isocyanates by phosgenation following substantially the procedure disclosed in U.S. Pat. No. 2,822,373. After the phosgenation, the o-dichlorobenzene is removed by fractional distillation at reduced pressure. The undistilled product contains about 72% 4,4'-diisocyanatodiphenylmethane. The rest of the mixture consists of polyisocyanates and phosgenation by-products which are present in about equal amounts. The amine equivalent of this material is about 140 based on its analysis for isocyanato groups by ASTM D–1638–60T.

Tests are made on the various isocyanates and foams prepared in the Examples as follows:
  Isocyanato contents — ASTM D1638–60T
  Amine equivalents — ASTM D1638–60T
  Compressive strength — ASTM D1621–59T
  Thermal conductivity — ASTM C177–45 (K-factor)
  Dimensional stability — ASTM D794–49
  Friability — ASTM C421
  Density — ASTM D1622–59T All densities specified in the Examples are core densities. Parts and percentages are by weight unless otherwise indicated. In any composition of this invention, isocyanato group functionality can be determined by calculating the number of isocyanato groups per molecule of material. The isocyanate content is measured by the amine equivalents test given above and molecular weight can readily be determined vapor phase osmometry using a Hitachi Perkin-Elmer vapor phase osmometer.

EXAMPLE 1

To 1,750 parts of Polyisocyanate B (—NCO content 37.4 percent) contained in an agitated vessel blanketed with dry nitrogen is added about 12.8 parts of N-ethyl aziridine, The temperature rises from about 25° to 66° C. After about 20 minutes the liquid reaction mass thickens and the isocyanato group content drops to about 31.3 percent. Further trimerization is prevented by the addition of 17.5 parts of benzoyl chloride. The reaction mass is diluted by the addition of 1,750 parts of Polyisocyanate B and allowed to cool to about 25° C. while stirring. The resulting product has a Brookfield viscosity of 1,069 centipoises at 28° C. and an isocyanato group assay of 33.85 percent corresponding to an amine equivalent of 124. The decrease in isocyanato group assay corresponds to an isocyanurate radical content of about 3.55 percent. The material contains the equivalent of about 25 percent of non-volatile phosgenation by-products.

Rigid foam is prepared from the composition of this example using the following formulation:

Part A

| | |
|---|---|
| Polyisocyanate composition | 93 parts |

Part B

| | |
|---|---|
| Polyether polyol obtained by oxypropylating sucrose; hydroxyl number 470, equivalent weight 120, viscosity 22,000 cps. at 25°C., amine nitrogen about 1.2% ("Selectrofoam" 6406) | 100 parts |
| Foam stabilizing surfactant, a hydrolytically stable poly-(oxyalkylene) poly(dimethylsiloxane) block copolymer, commercially available as DC-195 | 2 parts |
| N,N-dimethylethanol amine | 1 part |
| Dibutyl tin dilaurate | 0.1 part |
| Trichlorofluoromethane | 40 parts |

Part A and Part B are mixed for about 12 seconds with a high speed laboratory mixer and the blend is poured into a suitable mold and allowed to foam. The foam time; that is, the time required for the foam to reach maximum height from the start of mixing, is 90 seconds. The resulting foam has a density of 1.63 lbs./cu.ft., a K-factor of 0.109 BTU/hr./ft.$^2$/° F./in.) and a friability of 27.4 percent by ASTM method C–421.

Substantially the same results are obtained when foam preparation is repeated by the above procedure using 0.3 part of a 33 percent solution of triethylene diamine in dipropylene glycol in place of the 0.1 part of dibutyl tin dilaurate.

The above data indicate that the foam prepared in this example is of low density yet has excellent thermal insulation properties and acceptable resistance to friability.

EXAMPLE 2

To 400 parts of Polyisocyanate C (—NCO content 30.0 percent) contained in an agitated vessel blanketed with dry nitrogen is added about 5 parts of N-ethyl aziridine. The temperature rises from about 25° to 50° C. After 3.5 hours, 4 parts of benzoyl chloride is added to prevent further trimerization. The reaction mass is diluted by adding 400 parts of Polyisocyanate C and stirring for 30 minutes at 80°–90° C. to produce a uniform product. The Brookfield viscosity of this material is 1,628 cps. at 25° C. It has an isocyanato group assay of 26.9 percent which corresponds to an amine equivalent of 156. The decrease in isocyanato group assay corresponds to an isocyanurate content of 3.1 percent. The material contains the equivalent of about 14 percent of non-volatile phosgenation by-products.

EXAMPLE 3

To 5,400 parts of a 4:1 mixture of Polyisocyanate A and Polyisocyanate C (—NCO content of mixture 39.8 percent) contained in an agitated vessel blanketed with dry nitrogen is added 40 parts of N-ethyl aziridine. The temperature rises from about 25° to 83° C. over about 1.5 hours at which time the reaction is stopped by the addition of about 50 parts of benzoyl chloride. To 2,700 parts of this material which has an isocyanato group assay of 31.7 percent is added 340 parts of Polyisocyanate C and 1,360 parts of Polyisocyanate A. The resulting mixture is agitated until it is uniformly mixed. The diluted product has an isocyanato group assay of 34.9 percent corresponding to an amine equivalent of 120. The decrease in isocyanate group assay corresponds to an isocyanurate radical content of 4.9 percent. The diluted mixture contains the equivalent of about 13 percent of non-volatile phosgenation by-products.

EXAMPLE 4

To 2,000 parts of Polyisocyanate A (—NCO content 43.1 percent) contained in an insulated, agitated reaction vessel blanketed with dry nitrogen is added about 16 parts of N-ethyl aziridine. Trimerization is allowed to proceed until the assay for isocyanato groups is less than 32 percent. At this point, 300 parts of Polyisocyanate A and 20 parts of benzoyl chloride are added. The resulting product has an isocyanate group assay of 32.2 percent which corresponds to an amine equivalent of 130. The decrease in isocyanate assay corresponds to an isocyanurate radical content of 10.9 percent. The material contains the equivalent of about 12.5 percent of non-volatile phosgenation by-products.

To 100 parts of this material is added about 15 parts of trichlorofluoromethane. The mixture does not deposit any solids when stored at about 5° C.

Rigid foam is prepared from the undiluted polyisocyanate composition of the example using the following formulations:

Part A

| | |
|---|---|
| Polyisocyanate composition | 112 parts |

Part B

| | |
|---|---|
| Polyether polyol described in Example 1 | 100 parts |
| Surfactant described in Example 1 | 2 parts |
| N,N-dimethylenthanol amine | 3.4 parts |
| Trichlorofluoromethane | 72 parts |

Part A and Part B are mixed together for about 4 seconds with a high speed laboratory mixer and the blend is poured into a suitable mold and allowed to foam. The foaming time is about 90 seconds. The foam has a density of 1.16 lbs./cu. ft. and a K-factor of 0.143 BTU/hr./sq. ft./(° F./in.). The compressive strength parallel to blow is 10 psi, perpendicular to blow, 12.6 psi.

It is thus seen that the low density foam of this example exhibits excellent compressive strength and thermal insulation, two very important features in foam performance.

EXAMPLE 5

To 2,014 parts of Polyisocyanate A (—NCO content 42.4 percent) contained in an insulated, agitated reaction vessel blanketed with dry nitrogen is added about 9 parts of N-ethyl aziridine. Trimerization is allowed to proceed over a period of about 6 hours during which the temperature rises from 25° C. to about 54° C. The reaction is stopped by the addition of 10.1 parts of benzoyl chloride. The resulting product has an isocyanato group assay of 38.5 percent corresponding to an amine equivalent of 109. The decrease in isocyanato group assay corresponds to an isocyanurate radical content of 4.3 percent. The material contains the equivalent of about 12.5 percent of non-volatile phosgenation by-products.

EXAMPLE 6

To 100 parts of Polyisocyanate A is added 4.6 parts of a hexol having an equivalent weight of about 125 which is the reaction product of 1,2-propylene oxide and sorbitol. After the hexol reacts, the modified polyisocyanate has an isocyanato group content of 38.8 percent.

To 52.5 parts of the modified Polyisocyanate A contained in an insulated agitated reaction vessel at 26° C. is added 0.052 parts of tetramethylguanidine over a period of 17 minutes. The polyisocyanate is allowed to trimerize for 12.5 hours after which the temperature rises to 63° C. Trimerization is stopped by adding 0.255 parts of benzoyl chloride. The resulting product has an isocyanato group assay of 33.9 percent and a Brookfield viscosity of about 1,000 cps. at 23° C. The decrease in isocyanato group assay corresponds to an isocyanurate radical content of 4.7 percent. The material contains the equivalent of about 12 percent of non-volatile phosgenation by-products.

Rigid foam is prepared from this polyisocyanate by a one-shot procedure in which two streams are brought together continuously in a high-speed mixing head. The ingredients employed and their proportions by weight are given below:

Stream A (42°C.)

| | |
|---|---|
| Polyisocyanato composition | 107 parts |

Stream B (22.5°C.)

| | |
|---|---|
| Polyol described in Example 1 | 100 parts |
| Surfactant described in Example 1 | 2 parts |
| N,N-dimethylethanol amine | 2.4 parts |
| Triethylene diamine, 33% in dipropylene glycol | 0.6 part |
| Trichlorofluoromethane | 71 parts |

Equipment suitable for metering and mixing these streams is described in Du Pont Elastomer Chemicals Bulletin HR–32, "Metering and Mixing Equipment for the Production of Urethane Foam Products" by S. A. Steward, E. I. du Pont de Nemours and Company (Inc.), Wilmington, Del., Sept. 1958.

The mixture discharged from the mixing head is directed into molds heated to 38° C. and allowed to foam. The foam time is 105 seconds and the foam becomes sufficiently rigid and tack-free to permit demolding in about 4 minutes. The foam has a core density of 1.40 lb./cu.ft. and a compressive strength of 15.5 psi perpendicular to blow. The original K-factor is 0.112 BTU/hr./sq.ft./(° F./-in.). After aging for 30 days at 60° C. the K-factor is 0.142. The friability of the foam in terms of loss by ASTM C–421 is 8.7 percent. The foam has good dimensional stability as indicated by no change in dimensions after 1 day at –26° C. and a 5 percent increase in linear dimensions after 7 days at 100° C.

The above data indicate that the foam of this example has a low density but demonstrates high compressive strength, thermal insulation, and dimensional stability. The foam also shows good friability resistance.

EXAMPLE 7

To 494.5 parts of Polyisocyanate A (–NCO content 42.1 percent) is added 0.253 parts of tetramethylguanidine and the mixture is agitated under dry nitrogen in an insulated reaction vessel. The initial temperature of 26° C. rises to 63.7° C. over a period of 48 hours and the isocyanato group assay drops to 36.8 percent. At this point the calculated isocyanurate content is 5.3 percent. Trimerization is stopped by the addition of 1.23 parts of benzoyl chloride. To the trimerized crude is added 21.0 parts of a hexol having an equivalent weight of about 125 which is the reaction product of 1,2-propylene oxide and sorbitol. After the hexol has reacted with the polyisocyanate the composition has an isocyanate group assay of 33.9 percent. The composition has a Brookfield viscosity of 908 cps. at 23° C. The isocyanurate radical content of this material, corrected for the addition of polyol is 5.1 percent. This material contains the equivalent of about 12 percent of non-volatile phosgenation by-products.

This material has substantially the same properties as the polyisocyanate composition prepared in Example 6. The only major difference in the preparation is the order in which polyol modification and trimerization are performed. When used to prepare rigid foam by standard procedures such as described in Example 6, the polyisocyanate composition of this example gives substantially equivalent results to those observed for the product of Example 6.

EXAMPLE 8

A solution of 10 parts of the trimer of refined 2,4-tolylene diisocyanate in 90 parts of Polyisocyanate A is used for preparing a rigid polyurethane foam. The trimer used is prepared substantially by the procedure of Example 5 of U.S. Pat. No. 2,801,244 and contains 24.6 percent isocyanato groups. The solution contains about 11 percent phosgenation by-products and about 2.4 percent isocyanurate radicals and has an amine equivalent of 103.

Foam is prepared by mixing 96.2 parts of the above solution with 156 parts of a foam masterbatch available commercially as "Selectrofoam" 6528 which is a mixture of about 75 percent of a rigid foam polyether polyol having an equivalent weight of about 120 and about 25 percent trichlorofluoromethane. The masterbatch is also believed to contain minor amounts of urethane foam catalysts and a polyoxyalkylene polydimethylsiloxane foam surfactant. Mixing is continued for 10 seconds after which the formulation is poured into a suitable container and allowed to foam. The foam time is 110 seconds; the tack-free time is 130 seconds. After standing for about 1 day the foam has a density of 1.55 lb./cu.ft., a K-factor of 0.119 BTU/hr./sq. ft./° F./in., a friability of 37.5 percent loss and a compressive strength of 24.5 psi parallel to blow. The foam has good dimensional stability as indicated by the following data:

| | |
|---|---|
| 7 days at 212°F. | 5% volume increase |
| 7 days at –20°F. | No change in volume |
| 7 days at 100°F. and 100% relative humidity | 5.5% volume increase |

EXAMPLE 9

Polyol-modified crude tolylene diisocyanate is prepared by reacting 100 parts of Polyisocyanate A and 4.6 parts of the hexol described in Example 6. The polyol-modified crude, having an isocyanato group assay of 38.4 percent, is trimerized by adding about 1.1 percent of N-phenethylaziridine over a 2-hour period. During the addition, the temperature of the crude diisocyanate increases from 24.5° to 110° C. At the end of the addition, trimerization is stopped by adding 1 percent of benzoyl chloride based on the starting weight of diisocyanate. The isocyanato group assay of this product is 28.6 percent. This product is diluted with an equal weight of the polyol-modified Polyisocyanate A described above which raises the isocyanato group assay to 32.7 percent. This product contains the equivalent of about 12 percent phosgenation by-products, about 5.7 percent isocyanurate radicals and has an amine equivalent of 128.5.

In order to compare the performance of an isocyanate composition of this invention and a prior art crude isocyanate in preparing rigid foams, machine mixed foams are prepared from the polyol-modified Polyisocyanate A and the trimerized crude composition, both previously described in this example. In order to permit a comparison of these two crude isocyanates, the same percentage of blowing agent (20 percent) based on the total weight of the foam formulations is used and the same —NCO/OH ratio (1.05/1.0) is also used.

The formulations used, foaming characteristics and properties of the final foams are tabulated below.

|  | Trimerized Product | *Polyol-modified Polyisocyanate A |
|---|---|---|
| Stream A |  |  |
| Polyisocyanate, parts | 111.3 | 92.0 |
| Stream B |  |  |
| Polyol described in Example 1, parts | 100.0 | 100.0 |
| Dimethylethanol amine, parts | 3.4 | 3.4 |
| Triethylene diamine, 33% in dipropylene glycol, parts | 0.6 | 0.6 |
| Surfactant described in Example 1, parts | 2.0 | 2.0 |
| Trichlorofluoromethane, parts | 54.2 | 49.6 |
| Foam time, sec. | 71 | 90 |
| Over-all density, lb./cu.ft. | 1.94 | 2.02 |
| Compressive strength, perpendicular to blow, psi | 18.3 | 15.2 |
| K-factor | 0.116 | 0.120 |
| Friability, % loss | 13.0 | 25.5 |

*Outside the scope of invention, included for comparison only.

The trimerized product is faster reacting as indicated by the foam time. In addition, the foam produced from the trimerized polyisocyanate, even though of lower density, is superior in all properties measured.

All of the final mixtures of isocyanates described in Examples 1–11 have over-all average isocyanato group functionalities of at least 2.0, and the isocyanurate-containing monomers and polymers have an average functionality of at least about 1.5.

EXAMPLE 10

This example compares foams at two levels of density prepared from a prior art crude polyisocyanate and a polyisocyanate mixture obtained by trimerizing the same prior art crude.

To 1,200 parts of Polyisocyanate B having an NCO content of 39.2 percent is added 3 parts of 1,1,3,3-tetramethyl-guanidine. When the NCO content drops to about 32 percent, 3.5 parts of benzoyl chloride is added to prevent further trimerization and the mixture is heated to 160° C. for 1 hour. After cooling to room temperature, the NCO content is found to be 32.9 percent, corresponding to an amine equivalent of 128. The NCO decrease indicates an isocyanurate content of about 6.3 percent. The material contains the equivalent of about 25 percent phosgenation by-products.

A series of four foams are prepared from the trimerized Polyisocyanate B (Samples 4B and 4D) and the initial Polyisocyanate B (Samples 4A and 4C). All of the formulations use an —NCO/—OH ratio of 1.05/1.00. Two of the foams, 4A and 4B, employ 16.5 percent by weight of expanding agent based on the total weight of the formulation. Foams 4C and 4D are based on formulations containing 13 percent by weight of expanding agent.

The formulations are tabulated below:

| Part A | 4A* | 4B | 4C* | 4D |
|---|---|---|---|---|
| Polyisocyanate B of this example, parts | 100 | — | 100 | — |
| Trimerized Polyisocyanate B of this example, parts | — | 100 | — | 100 |

* Outside scope of the invention.

| Part B | 4A | 4B | 4C | 4D |
|---|---|---|---|---|
| Hexol described in Example 7, parts | 109 | 92 | 109 | 92 |
| Triethylenediamine, 20% solution in N,N-dimethylethanol amine, parts | 1.5 | 1.5 | 1.5 | 1.5 |
| Poly(oxyalkylene)/poly(dimethylsiloxane) block copolymer, commercially available as DC-195, parts | 2.0 | 2.0 | 2.0 | 2.0 |
| Chlorotrifluoromethane, parts | 42 | 39 | 32 | 29 |

Part A and Part B for each formulation are mixed with a high-speed laboratory mixer for about 15 seconds and then poured into an open mold and allowed to foam. After standing for a day the foams are found to have the following properties:

|  | 4A | 4B | 4C | 4D |
|---|---|---|---|---|
| Density, lb./cu.ft. | 1.73 | 1.66 | 2.08 | 2.11 |
| Compressive strength, parallel to blow, psi. | 26 | 28 | 32 | 40 |
| K-factor, parallel to blow | 0.158 | 0.152 | 0.152 | 0.133 |
| Friability, % loss | 46 | 43 | 26 | 28 |

When prior art foam 4A is compared with foam 4B of similar density and K-factor together, it can be estimated that about 108 parts by weight of foam 4A would be required to provide a degree of insulation equivalent to that of 100 parts of the foam of this invention. When foams 4C and 4D are compared similarly, it can be estimated that 1.3 parts of prior art foam 4C would be required to provide insulation equivalent to that of 100 parts of foam 4D.

The term "equivalent of phosgenation by-products" appearing in the examples is used to denote that the phosgenation by-products are not in the form they were after phosgenation, but instead are part of more complex molecules formed by reaction of the phosgenation by-products with other isocyanates and active hydrogen bearing compounds which can be present in the polyisocyanate compositions of this invention.

What is claimed is:

1. A polyisocyanate composition which consists essentially of the product prepared by the process of (1) phosgenating an aromatic polyamine to obtain a crude polyisocyanate composition containing phosgenation by-products, and (2) trimerizing in the presence of a catalyst a portion of the isocyanato groups of the product obtained in step (1) until about 3–11 percent by weight of the total composition is isocyanurate radicals, said polyisocyanate composition being further characterized in having an amine equivalent of about 92-170 and an overall average isocyanato group functionality of at least about 2.

2. A composition of claim 1 wherein the crude polyisocyanate in step (1) is distilled to concentrate the phosgenation by-products, with the proviso that the amount of phosgenation by-products present in the final polyisocyanate composition does not exceed 50 percent by weight.

3. A composition of claim 1 wherein the product of step (1) contains about 10-30 percent by weight phosgenation by-products and the amine equivalent is about 100-140.

4. A composition of claim 1 wherein the aromatic polyamine is at least one tolylene diamine.

5. A polyisocyanate composition having an isocyanurate radical content of about 3-11 percent by weight, said isocyanurate being the product of isocyanate which has been trimerized in the presence of a catalyst, a phosgenation by-product content of about 5-50 percent by weight, an amine equivalent of about 92-170 and an average over-all isocyanato group functionality of at least about 2, which consists essentially of the composition of claim 1 reacted with an active hydrogen-containing compound bearing at least two active hydrogen atoms.

6. A composition of claim 5 wherein the phosgenation by-product content is about 10-30 percent by weight and the amine equivalent is about 100-140.

7. A composition of claim 5 wherein the aromatic polyamine is at least one tolylene diamine.

8. A composition of claim 5 wherein the active-hydrogen containing compound is a polyol having from 3 to 8 hydroxy groups and an equivalent weight of about 80-500.

9. A composition of claim 7 wherein the active-hydrogen containing compound is a polyol having from 3 to 8 hydroxy groups and an equivalent weight of about 80-500.

10. The polyurethane foam prepared by reacting a polyisocyanate with at least one active hydrogen-containing compound in the presence of a blowing agent wherein the polyisocyanate is the composition of claim 5.

11. A composition of claim 10 wherein the foam is a rigid foam.

12. A polyurethane prepared by reacting a polyisocyanate with at least one active hydrogen-containing compound wherein the polyisocyanate is the composition of claim 1.

13. A polyurethane foam prepared by reacting a polyisocyanate with at least one active hydrogen-containing compound in the presence of a blowing agent wherein the polyisocyanate is the composition of claim 1.

14. The polyurethane composition of claim 13 wherein the foam is a rigid foam.

15. A polyisocyanate composition consisting essentially of the product prepared by (1) phosgenating an aromatic polyamine to produce a crude composition containing phosgenation by-products, and (2) mixing a trimerized aromatic polyisocyanate which has been trimerized in the presence of a catalyst, with the product of step (1) in such proportions to prepare a product containing about 5-50 percent by weight phosgenation by-products and about 3-11 percent by weight isocyanurate radicals, said polyisocyanate composition being further characterized in having an amine equivalent of about 92-170 and an average over-all isocyanato group functionality of at least two.

16. A composition of claim 15 wherein the crude polyisocyanate prepared in step (1) is distilled to concentrate the phosgenation by-products.

17. A composition of claim 15 wherein the phosgenation by-products are present in the amount of about 10-30 percent by weight and the amine equivalent is about 100-140.

18. A composition of claim 15 wherein the aromatic polyamine is at least one tolylene diamine and the isocyanurate radicals are obtained by trimerizing tolylene diisocyanate.

19. A polyisocyanate composition containing about 10-30 percent by weight phosgenation by-products, about 3-11 percent by weight isocyanurate radicals said radicals having been formed by trimerizing isocyanato groups in the presence of a catalyst and having an amine equivalent of 100-140 and an average over-all isocyanato group functionality of at least 2, which consists essentially of the composition of claim 15 in combination with an active hydrogen-containing compound bearing at least two active hydrogen atoms.

20. A composition of claim 19 wherein the aromatic polyamine is a tolylene diamine, the isocyanurate radicals are obtained by trimerizing tolylene diisocyanate and the active-hydrogen-containing compound is a polyol having from 3 to 8 hydroxy groups and an equivalent weight of about 80-500.

21. The polyurethane foam prepared by reacting a polyisocyanate with at least one active hydrogen-containing compound in the presence of a blowing agent wherein the polyisocyanate is the composition of claim 20.

22. A composition of claim 21 wherein the foam is a rigid foam.

* * * * *

UNITED STATES PATENT OFFICE
CERTIFICATE OF CORRECTION

Patent No. 3,723,363         Dated March 27, 1973

Inventor(s) FRED D. SHAW, JR.

It is certified that error appears in the above-identified patent and that said Letters Patent are hereby corrected as shown below:

On the cover sheet insert -- [73] Assignee E. I. du Pont de Nemours and Company, Wilmington, Del., a corp. of Delaware --.

Signed and sealed this 28th day of August 1973.

(SEAL)
Attest:

EDWARD M. FLETCHER, JR.　　　　RENE D. TEGTMEYER
Attesting Officer　　　　　　　　Acting Commissioner of Patents